United States Patent [19]
Nakai

[11] Patent Number: 5,252,297
[45] Date of Patent: Oct. 12, 1993

[54] PROCESS FOR PRODUCING CARBON BLACK AND APPARATUS THEREFOR

[75] Inventor: Kiyonari Nakai, Aichi, Japan

[73] Assignee: Tokai Carbon Co., Ltd., Tokyo, Japan

[21] Appl. No.: 789,497

[22] Filed: Nov. 8, 1991

[30] Foreign Application Priority Data

Nov. 13, 1990 [JP] Japan .................. 2-306532

[51] Int. Cl.⁵ ............................................. C09C 1/48
[52] U.S. Cl. .................. 422/150; 422/151; 422/156; 423/456; 423/457
[58] Field of Search ............... 422/150, 151, 152, 156, 422/220, 228, 176; 423/456, 457; 431/2, 4, 8, 350, 353

[56] References Cited

U.S. PATENT DOCUMENTS

| | | |
|---|---|---|
| 2,682,450 | 6/1954 | Sweigart et al. ............ 422/151 |
| 2,865,717 | 12/1958 | Krejei ............................ 423/456 |
| 3,607,057 | 9/1971 | Henderson .................... 422/150 |
| 3,998,934 | 12/1976 | Vanderveen .................. 423/456 |
| 4,165,364 | 8/1979 | Dollinger et al. ............. 431/8 |
| 4,183,896 | 1/1980 | Gordon ......................... 422/176 |
| 4,931,789 | 7/1983 | Estopinal ...................... 423/457 |
| 4,988,493 | 1/1991 | Norman et al. ............... 423/457 |
| 5,058,381 | 10/1991 | Christenson et al. ........ 422/176 |

Primary Examiner—Robert J. Warden
Assistant Examiner—Hien Tran
Attorney, Agent, or Firm—Armstrong, Westerman, Hattori, McLeland & Naughton

[57] ABSTRACT

An apparatus for producing carbon black comprises a reaction chamber which consists of a tapered throat and a downstream extension of the throat having the same diameter as that of the narrowest portion of the throat and provided with a plurality of ribs on its inner wall which define a plurality of flits parallel to the axis of the reaction chamber. The reaction chamber is equipped, on the upstream side of the extension, with means for introducing the feedstock oil perpendicularly to the axis of the chamber.

1 Claim, 1 Drawing Sheet

PROCESS FOR PRODUCING CARBON BLACK AND APPARATUS THEREFOR

BACKGROUND OF THE INVENTION

This invention relates to a process for producing carbon black and an apparatus therefor and, more specifically, to a process and an apparatus for producing a carbon black which has both a primary structure and tinting strength on high levels.

Of the properties inherent in carbon black, the primary structure and tinting strength are regarded as important attributes for greatly enhancing and reinforcing the properties of rubber into which the carbon black is compounded.

By "primary structure" is meant the nondestructive aggregate evaluated in terms of dibutyl phthalate absorption number of compressed sample defined in ASTM D3493-85a (the number being hereinafter called "24M4DBP" for brevity). Known manufacturing processes for carbon black with high 24M4DBP include the following. One process involves the introduction of feedstock oil as divided into principal and secondary feedstocks into a reaction zone where they are thermally decomposed by high-temperature combustion gas formed by burning fuel oil (U.S. Pat. No. 3,952,087). Another process consists in introducing high-temperature combustion gas into a reaction zone which is reduced in diameter downstream in throat-like fashion and inserting a feed-stock oil spray nozzle from the upstream side into the reaction zone along the axis of the zone, with the degree of nozzle insertion adjusted so as to change the point at which the feedstock oil is issued (Japanese patent application Kokai publication No. 52-85995). These processes permit some increases in 24M4DBP.

The conventional processes, however, have the disadvantage of broadening the aggregate distribution and accordingly bringing about a remarkable reduction in the tinting strength. To overcome this disadvantage, the present applicant has previously proposed a process whereby a plurality of separately produced streams of gas containing a carbon black precursor is led at a high speed into a principal reaction zone for impingement (Japanese patent publication No. 62-10581) and an improvement of the process 0 (Japanese patent publication No. 62-20227). These processes achieve further improvements in 24M4DBP over the conventional techniques such as the introduction of feedstock oil in divided streams. However, they involve difficulties in simultaneously attaining an enhancement of tinting strength.

Thus, primary structure and tinting strength are contradictory properties of carbon black. No technique has hitherto been developed which is effective in increasing both of the properties.

SUMMARY OF THE INVENTION

The present invention is aimed at providing a process for producing a carbon black with both 24M4DBP and tinting strength increased relatively and also providing an apparatus therefor.

The carbon black manufacturing process for achieving the aim of the invention comprises forming a high-temperature combustion gas by burning a fuel oil, gradually narrowing down the stream of the combustion gas and simultaneously introducing a feedstock oil into the stream perpendicularly to the axis thereof, thermally decomposing the feedstock oil with the high-temperature combustion gas to form a narrowed stream of a resultant gas containing a carbon black precursor, and thereafter cooling the resultant gas, said narrowed resultant gas stream being led to a plurality of slits provided in an extension of the same diameter as the narrowest portion of the stream and parallel to the axis on the downstream side of the point where the feedstock oil is introduced, whereby the resultant gas stream is disturbed and agitated.

The carbon black manufacturing apparatus for achieving the aim of the invention comprises a large-diameter combustion chamber for burning a fuel oil to form a high-temperature combustion gas, a reaction chamber tapered like a throat and located on the downstream side of, and coaxially connected to, the combustion chamber so as to decompose thermally the feedstock oil with the high-temperature combustion gas to form a resultant gas containing a carbon black precursor, and a large-diameter cooling chamber located on the downstream side of, and coaxially connected to, the reaction chamber, said reaction chamber consisting of a tapered throat and a downstream extension of the throat having the same diameter as that of the narrowest portion of the throat and provided with a plurality of ribs on the inner wall thereof which define a plurality of slits parallel to the axis of the reaction chamber, said reaction chamber being equipped, on the upstream side of the extension, with means for introducing the feedstock oil perpendicularly to the axis of the reaction chamber.

DETAILED DESCRIPTION OF THE PREFERRED EMBODIMENTS

Figure 1:
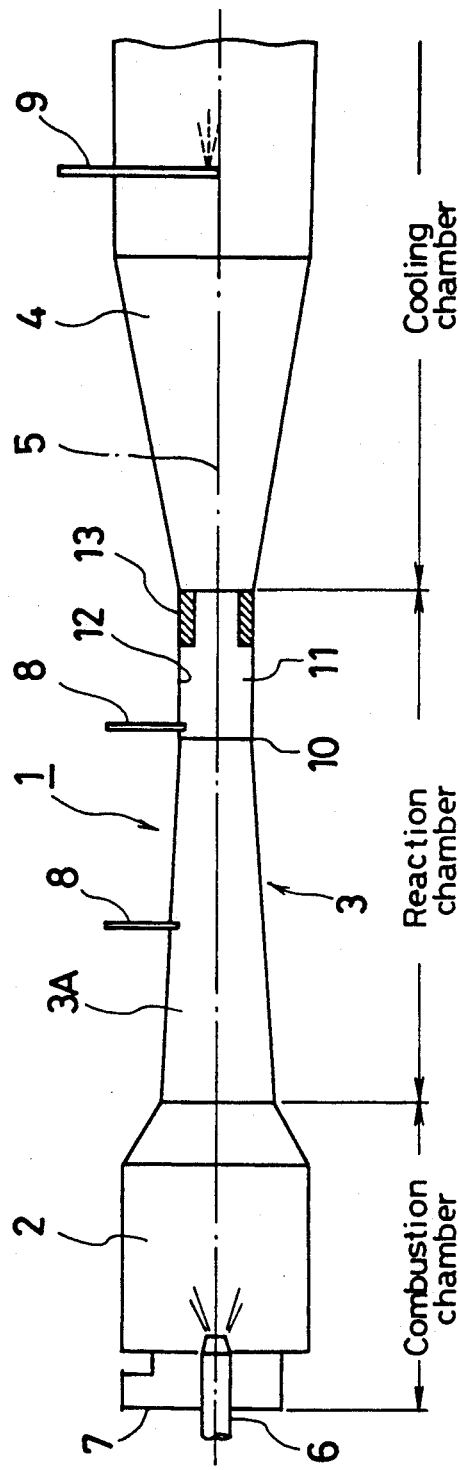
FIG. 1 is a schematic sectional view of an apparatus for producing carbon black in accordance with the invention.

The apparatus for producing carbon black in accordance with the invention will first be explained in connection with an embodiment shown in FIG. 1. The apparatus 1 comprises a large-diameter combustion chamber 2, a tapered reaction chamber 3, and a large-diameter cooling chamber 4. The reaction chamber 3 is coaxially connected, on the downstream side, to the combustion chamber 2, and likewise the cooling chamber 4 on the farther downstream side to the reaction chamber 3, altogether in a continuous cylindrical configuration.

The combustion chamber 2 is a zone in which high-temperature combustion gas is formed by the combustion of fuel oil. The chamber 2 at its head is equipped with a combustion burner 6 partly inserted along the central axis into the chamber and a duct 7 for supplying combustion air tangentially to the chamber.

The reaction chamber 3 is a zone in which feedstock oil is thermally decomposed by the high-temperature combustion gas produced in the combustion chamber 2 to form a gas containing a carbon black precursor. It is provided with a plurality of feedstock oil injecting means, e.g., spray nozzles 8, perpendicularly to the axis 5 of the furnace.

The cooling chamber 4 is a zone in which the resultant gas produced in the reaction chamber 3 is cooled, and is equipped with a quench 9 for water cooling use.

It is important for the carbon black manufacturing furnace of the invention that the reaction chamber 3 should consist of a tapering throat 3A and an extension 11 formed downstream of the throat 3A and having a diameter equal to that of the narrowest part 10 of the throat, the extension 11 having a plurality of inwardly projecting ribs 13 formed on the inner wall 12 and which define a plurality of slits 14 parallel to the axis 5 (see FIG. 2), with the feedstock oil spray nozzles 8 being located on the upstream side of the slits 14. While the slits 14 may be formed at any point inside the extension 11, it is desirable that, as shown in FIG. 1, the downstream ends of the inwardly projecting ribs 13 should be flush with the downstream end of the extension 11.

Figure 2:
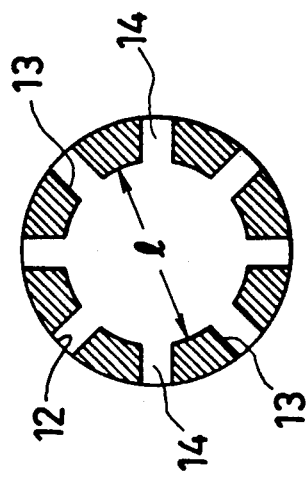
FIG. 2 is a cross-sectional view illustrating a slitted part of the apparatus.

FIG. 2 is a cross-sectional view illustrating a typical arrangement of the ribs 13. The ribs 13 of the same contour are shown equidistantly spaced from one another on the inner wall 12 of the extension 11 in such a manner that their downstream ends are flush with the downstream end of the extension 11, providing a plurality of slits 14 parallel to the axis 5 of the furnace.

The inside diameter l of the slitted part and the shape and number of the slits 14 (i.e., the size, shape, and number of the ribs 13) are suitably chosen in consideration of the scale of the carbon black manufacturing furnace 1, the 24M4DBP and tinting strength of the carbon black produced, and other factors involved.

For example, with an extension 11 having an inside diameter of about 180 mm, the ribs 13 are about 15 mm high (the l being approximately 150 mm) and a total of eight 30 mm-wide slits 14 are formed.

Now the functions of the carbon black manufacturing furnace 1 embodying the invention will be explained with reference to FIG. 1.

First, fuel oil is supplied to the combustion burner 6 of the combustion chamber 2 and air to the duct 7, so that the fuel oil burns to form a high-temperature combustion gas. The high-temperature combustion gas flows into the reaction chamber 3, where the feedstock oil spray nozzles 8 inject feedstock oil into the stream of the combustion gas to decompose it thermally so as to form a gas containing a carbon black precursor. The resultant gas is led through the extension 11 into the cooling chamber 4, where it is cooled with the water sprayed by the quench 9 and carbon black is collected from it by a collector not shown.

Because the extension 11 has the plurality of slits 14 formed parallel to the axis of the furnace as noted above (FIG. 2), the resultant gas stream formed in the reaction chamber 3 and containing the carbon black precursor is vigorously agitated as it flows past the slits 14. Consequently, the particles of the carbon black precursor contained in the resulting gas repeatedly impinge on one another with violence until they aggregate, forming a carbon black with both 24M4DBP and tinting strength enhanced.

If the feedstock oil is fed directly to the slits 14, the carbon black precursor is subjected to violent agitation as soon as it is formed. It becomes difficult to promote adequate impingement of the precursor particles and their aggregation. If, instead, the feedstock oil is fed downstream of the slits 14, there is no possibility of the slits achieving the agitation effect upon the resultant gas.

Further, if any slitless cylindrical body is inserted into the extension 11, the flow passage (cross section) is narrowed compared with the passage according to the present invention which is provided with the slits 14. The result is a greater energy loss due to increased resistance to the gas flow.

The process and apparatus of the invention will be described below in connection with examples thereof and comparative examples.

EXAMPLE 1-3

A carbon black manufacturing apparatus was installed which, as shown in FIG. 1, comprised: a large-diameter combustion chamber 2 having a diameter of 500 mm and a length of 800 mm (including 500 mm of a tapered part) and equipped with a duct 7 for tangentially supplying combustion air and an axial combustion burner 6 both at the head of the furnace; a reaction chamber 3 consisting of a throat 3A gradually reduced in diameter from 250 mm down to 180 mm over a length of 700 mm and an extension 11 having a constant diameter of 180 mm and a length of 300 mm; and a cooling chamber consisting of a flared part 1000 mm long and a large-diameter part 500 mm in diameter and 5000 mm long, all in a coaxial arrangement. On the inside wall of the extension 11 was provided a plurality of ribs, each having a truncated conical shape in cross section, spaced an equal distance of 30 mm from one another, thus defining a corresponding number of 100 mm-long slits 14 parallel to the axis 5 of the furnace (refer to FIG. 2).

Feedstock spray nozzles 8 were installed partly through the furnace body, two diagonally with respect to the axis 5 at an intermediate point of the throat 3A to feed a first portion of the feedstock material and six equidistantly with respect to the axis in the vicinity of the inlet of the extension 11 to feed a second portion of the feedstock material.

A quench 9 for terminating the reaction was set at a point 4 to 5 meters downstream from the reaction chamber 3.

Three different types of carbon black were manufactured using feedstock oil and fuel oil of the properties listed in Table 1 and under the conditions given in Table 2.

The characteristics of the carbon blacks thus obtained, in relation to the manufacturing conditions used, are also shown in Table 2.

TABLE 1

| Property | Fuel oil | Feedstock oil |
|---|---|---|
| Specific gravity (15/4° C.) | 1.045 | 1.072 |
| Toluene insolubles (%) | 0.02 | 0.06 |
| Correlation coefficient (BMCI*) | 125 | 141 |
| S content (%) | 0.13 | 0.42 |
| Initial boiling point (°C.) | 200 | 177 |
| Na+ (ppm) | 4.7 | 1.1 |
| K+ (ppm) | 0.5 | 0.4 |

*The Bureau of Mines Correlative Index.

COMPARATIVE EXAMPLES 1-2

Carbon blacks were produced using the same apparatus as those used in Example 1 but without the provision of slits, under conditions similar to those used in the Examples of the invention.

The properties of the carbon blacks so obtained in relation to the manufacturing conditions adopted are shown in Table 2.

TABLE 2

|  | Example | | | Comparative Example | | |
| --- | --- | --- | --- | --- | --- | --- |
|  | 1 | 2 | 3 | 1 | 2 | 3 |
| Manufacturing condition | | | | | | |
| Total feed air rate (Nm³/H) | 5000 | 5000 | 5000 | 5000 | 5000 | 5000 |
| Fuel oil supply (kg/H) | 245 | 245 | 245 | 245 | 245 | 245 |
| Fuel combusiton rate (%) | 200 | 200 | 200 | 200 | 200 | 200 |
| Primary feestock oil feed (kg/H) | 0 | 0 | 170 | 0 | 170 | 0 |
| Secondary feestock oil feed (kg/H) | 1550 | 1460 | 1330 | 1420 | 1210 | 1370 |
| Slitted or not | yes | yes | yes | no | no | yes |
| Shape of slits | grooved | grooved | grooved | — | — | ringed |
| Property | | | | | | |
| Nitrogen adsorption specific surface area, $N_2SA$ (m²/g) | 95 | 106 | 110 | 97 | 107 | 105 |
| Dibutyl phthalate absorption number (ml/100 g) | 131 | 130 | 129 | 129 | 125 | 127 |
| 24M4DBP (ml/100 g) | 109 | 106 | 104 | 102 | 99 | 102 |
| Tinting strength (%) | 116 | 124 | 126 | 113 | 121 | 120 |

COMPARATIVE EXAMPLE 3

In place of the grooved slits defined by the ribs as in the Example 1, a cylindrical ring free of axial slits, 150 mm in inside diameter, was fitted in the extension 11, but otherwise similar conditions were used in preparing a carbon black.

The properties of the carbon black obtained, in relation to the manufacturing conditions, are also shown in Table 2.

The various properties were determined as follows: nitrogen adsorption specific surface area ($N_2SA$) was determined in conformity with the procedure of ASTM D3037-86; dibutyl phthalate absorption number, in conformity with JIS K6221 (1975), 6.1.2.; 24M4DBP, in conformity with ASTM D2493-85a; and tinting strength, in conformity with JIS K6221 (1982) using IRB#3 as a control sample.

Table 2 indicates that the carbon blacks of the Examples 1 to 3 that satisfy the requirements of the present invention are relatively improved in both 24M4DBP and tinting strength per unit specific surface area over those of the Comparative Examples. Then it can be seen that the invention concurrently imparts these properties on high levels to the product.

As stated, the apparatus for producing carbon black in accordance with the present invention and the manufacturing process using the apparatus can always smoothly produce a carbon black which combines high-level primary structure and tinting strength. The product, therefore, is useful as an ingredient to be compounded into rubber goods, such as tire treads, that require powerful reinforcements.

What is claimed is:

1. A cylindrical reactor for producing carbon black, comprising:
   a) a combustion chamber for forming a combustion gas stream, the combustion chamber having a diameter and an axis and including
      a combustion burner disposed on the axis of the combustion chamber for burning fuel oil and
      a duct disposed tangential to the combustion chamber for introducing combustion air into the combustion chamber;
   b) a reaction chamber downstream from, and connected to the combustion chamber and having an axis coaxial with the axis of the combustion chamber, whereby the combustion gas stream flows into the reaction chamber to form a reaction gas stream, the reaction chamber comprising
      a throat having a larger diameter tapering to a smaller diameter at a downstream end, the larger diameter of the throat being smaller that the diameter of the combustion chamber, and
      an extension coaxial with and connected to the downstream end of the throat, the extension having an inner surface and a diameter the same as the smaller diameter of the throat;
   c) a plurality of ribs arranged on the inner surface of the extension to form a plurality of slits defined between adjacent ribs;
   d) a means for introducing feedstock perpendicular to the axis of the reaction chamber into the combustion gas stream; and
   e) a cooling chamber downstream from, coaxial with, and connected to the extension, the cooling chamber including a means for quenching the reaction gas stream and an outlet.

* * * * *